(12) United States Patent
Zernikow et al.

(10) Patent No.: US 9,653,978 B2
(45) Date of Patent: May 16, 2017

(54) PERMANENT MAGNET, AND ELECTRIC MACHINE COMPRISING SAME, AND A METHOD FOR PRODUCING THE ELECTRIC MACHINE

(71) Applicant: Robert Bosch GmbH, Stuttgart (DE)

(72) Inventors: Maik Zernikow, Hildesheim (DE); Klaus Eppel, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 660 days.

(21) Appl. No.: 13/800,785

(22) Filed: Mar. 13, 2013

(65) Prior Publication Data

US 2013/0241334 A1 Sep. 19, 2013

(30) Foreign Application Priority Data

Mar. 13, 2012 (DE) .................. 10 2012 203 898

(51) Int. Cl.

| | |
|---|---|
| *H02K 1/02* | (2006.01) |
| *H02K 1/27* | (2006.01) |
| *H02K 1/28* | (2006.01) |
| *H02K 21/02* | (2006.01) |
| *H01F 7/02* | (2006.01) |
| *H02K 15/03* | (2006.01) |
| *H02K 1/04* | (2006.01) |

(52) U.S. Cl.
CPC .............. *H02K 21/02* (2013.01); *H01F 7/02* (2013.01); *H01F 7/0221* (2013.01); *H02K 1/02* (2013.01); *H02K 1/04* (2013.01); *H02K 1/27* (2013.01); *H02K 1/28* (2013.01); *H02K 15/03* (2013.01); *Y10T 29/49012* (2015.01)

(58) Field of Classification Search
CPC ........................................... H02K 1/27–1/2793
USPC ....................................... 310/156.01–156.84
See application file for complete search history.

(56) References Cited

U.S. PATENT DOCUMENTS

| | | | | |
|---|---|---|---|---|
| 4,491,769 A | * | 1/1985 | Heidelberg | ............ H02K 29/08 |
| | | | | 310/102 R |
| 4,935,080 A | * | 6/1990 | Hassell | ............... H01F 41/0253 |
| | | | | 156/153 |

(Continued)

FOREIGN PATENT DOCUMENTS

| | | |
|---|---|---|
| CN | 1852003 A | 10/2006 |
| DE | 102005001923 | 8/2005 |

(Continued)

OTHER PUBLICATIONS

Machine Translation, NAGATE, JP 05083892 A, Apr. 2, 1993.*
Machine Translation, SATSUU, JP 2005142374 A, Jun. 2, 2005.*
Machine Translation, TSUKANE, JP 02205307 A, Aug. 15, 1990.*

*Primary Examiner* — Thomas Truong
(74) *Attorney, Agent, or Firm* — Michael Best & Friedrich LLP

(57) ABSTRACT

Permanent magnet (10), containing at least one metal component (13) from the group of the rare earth metals, comprising a first coating film (20), which forms a cathodic protection against corrosion for the permanent magnet (10), the first coating film (20) containing a metal (23) which is more electronegative in the electrochemical series than the metal component (13) of the permanent magnet (10), wherein a second coating film (30), which is embodied in an electrically insulating fashion, is applied on the first coating film (20).

22 Claims, 2 Drawing Sheets

(56) References Cited

U.S. PATENT DOCUMENTS

| | | | | |
|---|---|---|---|---|
| 4,942,322 A * | 7/1990 | Raybould | ............ | H02K 1/2726 29/598 |
| 7,208,856 B2 * | 4/2007 | Imai | .................... | H02K 21/044 310/156.72 |
| 2005/0233068 A1 | 10/2005 | Yoshimura et al. | | |
| 2006/0097595 A1 * | 5/2006 | Randriamanantena | .. | H02K 1/30 310/156.08 |
| 2008/0202642 A1 * | 8/2008 | Sakamoto | ............... | B32B 15/01 148/525 |

FOREIGN PATENT DOCUMENTS

| | | | |
|---|---|---|---|
| EP | 0430198 | | 6/1991 |
| JP | 02205307 A | * | 8/1990 |
| JP | 04335501 A | * | 11/1992 |
| JP | 05083892 A | * | 4/1993 |
| JP | 2005142374 A | * | 6/2005 |

* cited by examiner

PERMANENT MAGNET, AND ELECTRIC MACHINE COMPRISING SAME, AND A METHOD FOR PRODUCING THE ELECTRIC MACHINE

BACKGROUND OF THE INVENTION

The invention is based on a permanent magnet and an electric machine comprising such a permanent magnet, and a method for producing the electric machine.

EP 0 430 198 B1 has disclosed a sintered rare earth permanent magnet having a coating film composed of a corrosion- and oxidation-resistant material. In this case, the coating film is applied to the permanent magnet for example by electrolytic coating or by means of electroless plating.

When such a permanent magnet is incorporated, for example into an electric machine, contact of the surface coating of the permanent magnet with a more electropositive metal in accordance with the electrochemical series can lead to oxidation of the metal constituents of the coating. As a result, the anticorrosion protective layer is damaged, as a result of which the material of the permanent magnet reacts electrochemically directly with the more electropositive metal of the surroundings. As a result, undesirable corrosion of the magnet material occurs in specific ambient conditions. Consequently, specific areas of use of such a rare earth magnet are ruled out.

SUMMARY OF THE INVENTION

Advantages of the Invention

By contrast, the permanent magnet according to the invention, the electric machine according to the invention, and the method according to the invention for producing such a machine have the advantage that, as a result of the permanent magnet being enveloped with an electrically insulating covering, the underlying anticorrosion protective layer is not attacked. This concerns, in particular, an installation situation in which the permanent magnet touches a metal which is more electropositive in the electrochemical series than the metal in the anticorrosion protective layer. The effect whereby the metal of the anticorrosion protective layer serves as a sacrificial anode for the electrochemical more electropositive magnet material is maintained as a result. Therefore, a rare earth magnet coated in this way can, in an electric machine, for example, bear directly against a lamination stack composed of electric laminations without the metal of the anticorrosion protective layer being oxidized by an electrochemical reaction with the lamination stack.

It is particularly advantageous to use the double coating for permanent magnets containing neodymium as rare earth metal. This applies in particular to neodymium-iron-boron magnets (NdFeB), such as, for example the magnet phase $Nd_2Fe_{14}B$ having a particularly high magnetic energy density.

A coating containing metallic zinc, which is for example electrochemically more electronegative than iron, is particularly suitable for the so-called cathodic protection against corrosion. In this case, the zinc is advantageously embodied in the form of flakes or flecks extending over the periphery of the permanent magnets.

A so-called zinc lamellar coating in which the zinc particles are embedded into a matrix serves as preferred coating for said cathodic protection against corrosion. In this case, the zinc particles are particularly advantageously embodied in lamellar or disc- or plate-shaped fashion in order to completely enclose the permanent magnet in a plurality of layers. Either organic or inorganic binders can be used as matrix for the zinc particles—or else alternatively for aluminum particles—, said binders subsequently being dried or fired.

In order that the cathodic anticorrosion protective layer does not react with more electropositive metals in the installation environment of the permanent magnet, the first coating film (protection against corrosion) is covered with a second (electrically insulating) coating film. Said second coating film advantageously has a high hardness and high strength in order that the second coating film is not damaged during installation and/or during operation of, for example, an electric machine. This is particularly important because if the second coating film is damaged, there is the risk of the more electronegative metal of the first coating film (sacrificial electrode) reacting electrochemically with the more electropositive installation environment. In this case, the electrically insulating layer is formed from an organic substance, for example a lacquer layer, or an epoxy resin or a silicone resin.

Alternatively, the second coating film consists of an electrically insulating inorganic substance, for example on the basis of silicon or silicates.

It is particularly advantageous for the permanent magnet to be completely enveloped with the second coating film of the electrical insulation, in order that the cathodic anticorrosion protective layer is optimally sealed relative to the environment. In an alternative embodiment, however, it is also possible for only those surfaces of the permanent magnet which come into contact with electrochemically more electropositive materials in the installation environment to be covered with the second coating film. In this case, the second coating film has a thickness of 5 to 50 µm, for example, in the dried state, a layer thickness of 10 to 30 µm preferably being provided for permanent magnets in electric machines.

The permanent magnets comprising the first and second coating films can particularly advantageously be inserted into a rotor or a stator of an electric machine embodied, for example, as a generator or electric motor. In this case, the magnetic field generated by the permanent magnet either induces a current or drives a rotor.

Depending on the embodiment of the electric machine, a plurality of individual permanent magnets can be incorporated into the rotor or into the stator. Alternatively, it is also possible to use a one-piece permanent magnet which is embodied in a ring-shaped fashion, for example, and has different magnetization directions over the circumference. Preferably, the at least one permanent magnet bears against a component of the rotor or of the stator that contains ferrous metal. This can be a lamination stack of the rotor, for example, which is composed of individual lamellar electric laminations, for example. Open or closed pockets are formed, for example, in said lamination stack, permanent magnets being inserted into said pockets. In this case, the permanent magnets are fixed for example by means of spring elements within the pockets. In this application, the permanent magnet is electrically insulated both from the lamination stack and from the metallic spring elements by the second, electrically insulating coating film. This prevents the "sacrificial metal" arranged in the first coating film from carrying out an electrochemical reaction with the ferrous metal in the environment. It is particularly advantageous in this case if the cutouts embodied as pockets in the lamination stack, at least at some electric laminations, have a closed inner peripheral wall within which the permanent magnet and/or the spring element are/is inserted. As a result of the permanent magnet being resiliently pressed against the peripheral wall, said permanent magnet is fixed very reliably in the rotor and is secured by the closed peripheral wall against being hurled out, even at high rotational speeds. In the case of such loading, a hard, impact-resistant, electrically insulating second coating film affords reliable sealing of the first coating film embodied as cathodic protection against corrosion. Alternatively, the spring elements can also be embodied as part of the lamination stack, in which case the second coating film then electrically insulates the first coating film simultaneously from the lamination stack and from the spring elements.

In accordance with the method according to the invention for producing an electric machine, the permanent magnet is firstly enveloped with the cathodic anticorrosion protective layer, which comprises a more electronegative metal than metal components of the permanent magnet. Afterward, said cathodic anticorrosion protective layer is enveloped with an electrically insulating coating having a particularly hard and impact-resistant surface. It is only after said electrically insulating coating has been completely dried or fired that the permanent magnet is inserted into a corresponding receptacle of the electric machine. This ensures that the cathodic anticorrosion protective layer is already protected by the electrical insulation layer actually prior to incorporation into the electric machine. By virtue of the completely dried hard surface of the electrical insulation layer, the permanent magnet can be inserted into the receptacles of the electric machine very simply in terms of production engineering, various types of clamping elements or else adhesive being usable for this purpose. In this case, the first coating film is preferably embodied as a zinc lamellar coating which can be applied, for example, by means of drawing, immersion-spinning or spraying methods. Afterward, the still liquid zinc lamellar covering is dried or fired in a furnace, for example, in order that a dry coating film having high adhesive strength arises. If appropriate, for better adhesion of the first and second coating films, very thin additional intermediate layers can be arranged between said films or directly onto the surface of the permanent magnet or surface treatments can be carried out.

The hard surface constitution of the second coating film makes it possible that, advantageously in terms of production engineering, firstly the permanent magnet is inserted into the cutout of the lamination stack, and then the spring element is inserted into the cutout, in order to fix the permanent magnet. The hard surface of the second coating film prevents destruction of the electrical insulation by the insertion of the spring element. Alternatively, the spring element can be formed from stainless steel, which is electrochemically better compatible with the metal of the first coating film.

Particularly advantageously, the permanent magnet coated according to the invention can be used in an electric machine, wherein the permanent magnet is directly in contact with motor components containing electrochemically more electropositive metals than the metal of the cathodic anticorrosion protective layer. Such electric machines can preferably be used as electric motor drives in a motor vehicle, both as drive motor for electric and hybrid vehicles and for electric motor comfort drives in a motor vehicle, in particular for a servo steering system.

BRIEF DESCRIPTION OF THE DRAWINGS

Various exemplary embodiments of the device according to the invention are illustrated in the drawings and explained in greater detail in the following description. In the figures.

DETAILED DESCRIPTION

Figure 1:
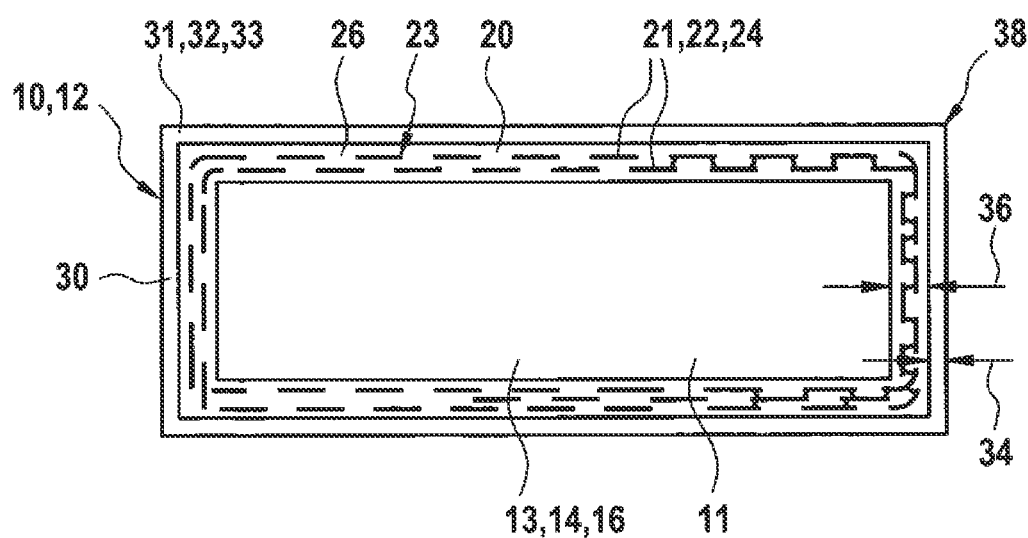
FIG. 1 shows a section through a permanent magnet according to the invention comprising a first and a second coating film.

FIG. 1 shows a section (not true to scale) through a permanent magnet 10 embodied, for example, as a bar magnet 12. The permanent magnet 10 has a magnet core 11, which consists of a magnet material containing at least one rare earth metal 13. By way of example, the magnet material is embodied as a neodymium-iron-boron magnet 14 containing the component Nd2Fe14B 16. The magnet core 11 is enclosed by a first coating film 20, which is embodied as protection against corrosion for the magnet core 11. In the exemplary embodiment, the magnet core 11 is completely surrounded by the first coating film 20, such that the barrier effect of said coating film 20 prevents corrosion or oxidation of the magnet material. Furthermore, the coating film 20 affords a so-called "cathodic protection against corrosion", by virtue of the fact that a metal 23 which is more electronegative in the electrochemical series than the magnet material of the magnet core 11, or of the rare earth metal 13 contained therein, is embedded into the coating film 20. By way of example, for this purpose the first coating film 20 contains metal particles 22 composed of aluminum or zinc, which serve as so-called sacrificial electrodes in order to prevent oxidation of the magnet material. The metal particles 22 are embodied as elongate flakes 24 or plate-shaped flecks 25 which preferably touch one another (illustrated on the right-hand side), such that the entire surface of the magnet core 11 is to an approximation enclosed by the metal particles 22. In the concrete exemplary embodiment, the coating film 20 is embodied as a so-called zinc lamellar coating 21 in which lamellar or plate-shaped metal particles 22 are arranged in an organic or inorganic matrix 26. The zinc lamellar coating 21 is applied to the magnet core 11 for example by means of spraying methods or an immersion-spinning method and is subsequently dried in a controlled manner. A second coating film 30, which is embodied in an electrically insulating fashion, is arranged on the first coating film 20. In the exemplary embodiment, the second coating film 30 completely encloses the first coating film 20, such that the first coating film 20 is electrically insulated from the environment in the installed state of the permanent magnet 10. The second coating film 30 is embodied such that it has very high impact resistance and wear resistance, in order that the electrical insulation is maintained both during the mounting of the permanent magnet 10 and during operation of an electric machine 40. The second coating film 30 is embodied as an insulating sealing of the first coating film 20 for example as an organic lacquer layer (31), as epoxy resin (32), as silicone resin (35) or as an inorganic coating on the basis of silicon (33). Depending on the material used, or depending on the coating method (spraying, immersion, deposition), the second coating film 30, embodied in an insulating fashion, has a layer thickness 34 of 5 to 50 μm. The first coating film 20 preferably likewise has a layer thickness 36 of 5 to 50 μm. In the exemplary embodiment, the permanent magnet 10 has a rectangular cross section 38. Depending on the application, however, said cross section 38 can also be embodied in a trapezoidal fashion, "in the shape of a loaf of bread" or else as an annulus or annulus segment. At the corners and edges, a radius can be integrally formed on the magnet core 11 and on the first and second coating films 20, 30 in a manner governed by production.

Figure 2:
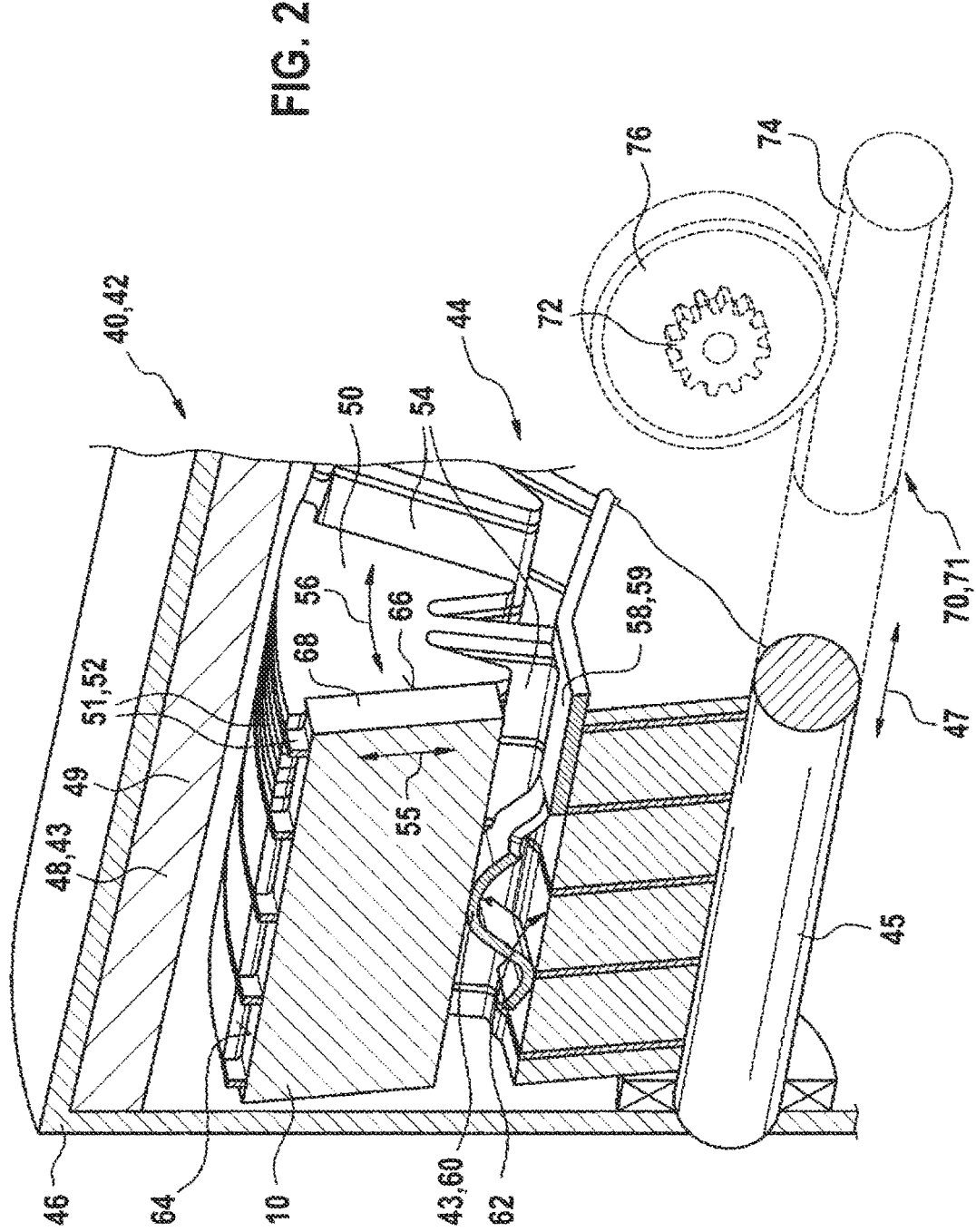
FIG. 2 shows an electric machine according to the invention comprising a permanent magnet according to the invention.

FIG. 2 shows an electric machine 40 with a permanent magnet 10 according to the invention incorporated therein. The electric machine 40 is embodied here as an electric motor 42, in particular as an electronically commutated EC motor. In this case, a rotor 44 is arranged on a rotor shaft 45 mounted in a motor housing 46. In the motor housing, the stator 48 is arranged around the rotor 44, said stator having, for example, electronically driven electric coils 49 for generating a driving magnetic field. The rotor 44 has, as an iron-containing component 43, a lamination stack 50 composed of individual lamination lamellae 52 formed from electric laminations 51. The rotor 44 has cutouts 54 that are continuous in an axial direction 47, the permanent magnets 10 being inserted into said cutouts. The bar magnets 12 are arranged here in a spoked fashion, for example, such that their dimensioning in a radial direction 55 is greater than their extent in a tangential direction 56. The lamination stack 50 here has different types of lamination lamellae 52, wherein the cutouts 54 are embodied such that they are partly radially outwardly open or radially outwardly closed. The permanent magnet 10 is fixed in the cutout 54 by means of a spring element 58, the permanent magnet 10 being pressed against the lamination stack 50. The spring element 58 is embodied here as a metallic stamped and bent part 59 which bears with a curved lug 60 against the permanent magnet 10. The spring element 58 is embodied here in one piece over the entire periphery and has a plurality of curved lugs 60 which each press a permanent magnet 10 against the inner peripheral wall 62 of the cutout 54. Alternatively, however, it is also possible to use individual spring elements 58 for each permanent magnet 10, or the spring elements 58 could be an integral part of the lamination lamellae 52. By virtue of the arrangement of the second coating film 30 above the first coating film 20, the latter is electrically insulated both from the lamination stack 50 and from the spring element 58. This prevents the electronegative metal of the first coating film 20 from being consumed by oxidation on account of contact bridges to the iron-containing component 43. If the spring element 58 is formed from high-grade steel, such oxidation of the electronegative metal 23 of the first coating film 20 is largely prevented even if the electrically insulating second coating film 30 is damaged during the mounting of the spring elements 58. Therefore, by way of example, firstly the permanent magnet 10 can be inserted into the cutout 54, and then the spring element 58 can be introduced into the cutout 54, in order to brace and securely fix the permanent magnet 10 relative to the lamination stack 50. The concrete configuration of the cutout 54 can be varied in order to correspondingly influence the magnetic flux in the rotor 44. In the exemplary embodiment, the permanent magnet 10 bears against the lamination stack 50 in a tangential direction 56. In a radial direction 55 the permanent magnet 10 is likewise pressed against the lamination lamellae 52 by the spring element 58, wherein, depending on the type of lamellae, the radial outer side 64 of the permanent magnet 10 bears completely or only partly against the respective lamination lamella 52. In the exemplary embodiment, the permanent magnet 10 with the second coating film 30 bears against the rotor 44 only at its radial outer sides 64 and tangential outer sides 66. Therefore, in a variation of the embodiment, under certain circumstances, it is possible to dispense with a second coating film 30 at the axial end sides 68 of the permanent magnet 10, as a result of which the magnet core 11 no longer has to be completely enclosed with the second coating film 30. Disposed downstream of the electric motor 42 in FIG. 2 is a schematically illustrated gear mechanism, which, via an output pinion 72, drives for example an adjustable part in a motor vehicle, in particular a part of a steering system. Alternatively, such a drive can also be used for the locomotion of a vehicle. For transmitting a torque of the electric motor 42 to the gear mechanism 70, the rotor shaft 45 has a toothing 74 that meshes with a corresponding gearwheel 76. In this case, the gear mechanism 70 is preferably embodied as a worm gear mechanism 71.

It should be noted that diverse possibilities for combining the individual features among one another are possible with regard to the exemplary embodiments shown in the figures and in the description. Thus, by way of example, the electric machine 40 can also be embodied without a gear mechanism 70 or with a form of gear mechanism that deviates from a worm gear mechanism 71. Thus, the electric machine 40 can, for example, also be used as a hybrid drive or as a generator in a motor vehicle. Likewise, a wide variety of types of pumps or fans can be operated by means of the electric motor 42. Instead of the spring elements 58, it is also possible to fix the permanent magnets 10 to corresponding components 43 of the electric machine 40 by other connecting means. Thus, the permanent magnets 10 can, for example, also be braced by other clamping means in the stator 48 or in the rotor 44 or be adhesively bonded into them. The shaping and arrangement and number of the permanent magnets 10 in the rotor 44 and/or in the stator 48 can also be correspondingly varied, for example in such a way that the extent of the permanent magnets 10 is greater in a tangential direction 56 than in a radial direction 55. Likewise, the concrete coating methods for applying the first and second coating films 20, 30 and the concrete choice of materials therefor can be varied according to the requirements.

What is claimed is:

1. A permanent magnet (10), containing at least one metal component (13) from the group of the rare earth metals, comprising a first coating film (20), which forms a cathodic protection against corrosion for the permanent magnet, the first coating film (20) containing a metal (23) which is more electronegative in the electrochemical series than the metal component (13) of the permanent magnet (10), and a second coating film (30), which is embodied in an electrically insulating fashion above the first coating film (20), wherein the first coating film (20) is embodied as a zinc lamellar coating (21) in which lamellar zinc particles (22) are incorporated in an inorganic matrix material (26), wherein the zinc lamellar coating (21) encloses the permanent magnet (10) in a plurality of lamellar layers, and wherein the metal particles (22) of the zinc lamellar coating (21) are comprised of elongate flakes (24) or plate-shaped flakes (25) which touch one another such that the surface of the magnet core (11) is to an approximation enclosed by metal particles (22).

2. The permanent magnet (10) according to claim 1, characterized in that the metal component (13) is neodymium (Nd).

3. The permanent magnet (10) according to claim 1, characterized in that the first coating film (20) contains as metal zinc.

4. The permanent magnet (10) according to claim 1, characterized in that the second coating film (30) has a high impact resistance and wear resistance.

5. The permanent magnet (10) according to claim 1, characterized in that the second coating film (30) is embodied as an inorganic coating (33).

6. A member of an electric machine (40), characterized in that at least one permanent magnet (10) according to claim 1 is fixed to the member in order to generate a magnetic field.

7. The member according to claim 6, wherein the member of the electric machine (1) is a rotor (44) and the at least one permanent magnet (10) is fixed to the rotor (44) in order to generate a magnetic field between the rotor (44) and a stator (48) of the electric machine (1).

8. An electric machine (1) including a permanent magnet according to claim 1, characterized in that in an incorporated state the at least one permanent magnet (10) bears directly against an iron-containing component (43) of a member of the electric machine (1).

9. The electric machine (1) according to claim 8, wherein the member of the electric machine (1) is a rotor (44).

10. The permanent magnet (10) according to claim 1, characterized in that the metal component (13) is neodymium (Nd), and the permanent magnet (10) is embodied as an NdFeB magnet (14) containing $Nd_2Fe_{14}B$ (16).

11. The permanent magnet (10) according to claim 1, characterized in that the first coating film (20) contains as metal zinc, which is embedded in the form of metallic flakes (24) in a matrix material (26).

12. The permanent magnet (10) according to claim 1, characterized in that the second coating film (30) has a high impact resistance and wear resistance, and is embodied as an organic lacquer layer (31) of epoxy resin (32).

13. The permanent magnet (10) according to claim 1, characterized in that the second coating film (30) is embodied as an inorganic coating (33) constructed on the basis of silicon.

14. The permanent magnet (10) according to claim 1, wherein a layer thickness (34) of the second coating film (30) is 5-50 μm.

15. The permanent magnet (10) according to claim 1, characterized in that the first coating film (20) completely encloses the permanent magnet (10).

16. The permanent magnet (10) according to claim 1, characterized in that the first coating film (20) and also the second coating film (30) completely enclose the permanent magnet (10).

17. An electric machine (1) including a permanent magnet (10) containing at least one metal component (13) from the group of the rare earth metals, the permanent magnet (10) including a first coating film (20), which forms a cathodic protection against corrosion for the permanent magnet (10), the first coating film (20) containing a metal (23) which is more electronegative in the electrochemical series than the metal component (13) of the permanent magnet (10), and a second coating film (30), which is embodied in an electrically insulating fashion, above the first coating film (20), wherein, in an incorporated state, the at least one permanent magnet (10) bears directly against an iron-containing component (43) of a member of the electric machine (1), and wherein the member has a lamination stack (50) with at least one cutout (54) shaped therein, in which the at least one permanent magnet (10) is inserted, wherein the first coating film (20) is embodied as a zinc lamellar coating (21) in which lamellar zinc particles (22) are incorporated in an inorganic matrix material (26), wherein the zinc lamellar coating (21) encloses the permanent magnet (10) in a plurality of lamellar layers, and wherein the metal particles (22) of the zinc lamellar coating (21) are comprised of elongate flakes (24) or plate-shaped flakes (25) which touch one another such that the surface of the magnet core (11) is to an approximation enclosed by metal particles (22).

18. The electric machine (1) according to claim 17, characterized in that the at least one cutout (54) has an inner peripheral wall (62) in a plane transversely with respect to a rotor shaft (45), and the at least one permanent magnet (10) is pressed against the inner peripheral wall (62) by means of a spring or clamping element (58).

19. The electric machine (10) according to claim 18, characterized in that the second coating film (30) electrically insulates the permanent magnet (10) from the lamination stack (50) and/or the spring element (58) of the member.

20. The electric machine (1) according to claim 17, wherein the member of the electric machine (1) is a rotor (44).

21. The electric machine (1) according to claim 17, wherein the inorganic matrix material (26) is dried.

22. The electric machine (1) according to claim 17, wherein the inorganic matrix material (26) is fired.

* * * * *